United States Patent [19]

Rogaway

[11] Patent Number: 5,491,749
[45] Date of Patent: Feb. 13, 1996

[54] METHOD AND APPARATUS FOR ENTITY AUTHENTICATION AND KEY DISTRIBUTION SECURE AGAINST OFF-LINE ADVERSARIAL ATTACKS

[75] Inventor: Phillip W. Rogaway, Austin, Tex.

[73] Assignee: International Business Machines Corporation, Armonk, N.Y.

[21] Appl. No.: 175,881

[22] Filed: Dec. 30, 1993

[51] Int. Cl.$^6$ .................................................. H04L 9/08
[52] U.S. Cl. ................................................ 380/21; 380/25
[58] Field of Search ................................... 380/21, 23–25; 340/825.31

[56] References Cited

U.S. PATENT DOCUMENTS

| | | | |
|---|---|---|---|
| 4,193,131 | 3/1980 | Lennon et al. | 380/21 |
| 4,438,824 | 3/1984 | Mueller-Schloer | 380/21 |
| 4,549,075 | 10/1985 | Saada et al. | 380/25 |
| 4,588,985 | 5/1986 | Carter et al. | 340/825.31 |
| 4,720,859 | 1/1988 | Aaro et al. | 380/25 |
| 4,723,284 | 2/1988 | Munck et al. | 380/25 |
| 4,799,061 | 1/1989 | Abraham et al. | 380/23 |
| 4,805,216 | 2/1989 | Gruenberg | 380/21 |
| 5,148,479 | 9/1992 | Bird et al. | 380/25 |
| 5,153,919 | 10/1992 | Reeds, III et al. | 380/21 |
| 5,241,599 | 8/1993 | Bellovin et al. | 380/21 |
| 5,299,263 | 3/1994 | Beller et al. | 380/21 |
| 5,371,294 | 12/1994 | Diffie et al. | 380/21 |

OTHER PUBLICATIONS

R. R. Jueneman, S. M. Matyas, C. H. Meyer, "Message Authentication", Sep. 1985, vol. 23, No. 9, pp. 29–40.
R. Bird, et al., "Systematic Design of a Family of Attack–Resistant Authentication Protocols", Jun. 1993, pp. 1–28.
Steven M. Bellovin, Michael Merritt, "Encrypted Key Exchange: Password–Based Protocols Secure Against Dictionary Attacks", pp. 1–13.
T. Mark A. Lomas, et al. "Reducing Risks from Poorly Chosen Keys", pp. 14–18.
Li Gong, et al. "Protecting Poorly Chosen Secrets from Guessing Attacks", Sep. 25, 1992, pp. 1–18.
Refik Molva, et al., "Research Report, KryptoKnight Authentication and Key Distribution System", Apr. 1, 1992, pp. 1–17.

Primary Examiner—Salvatore Cangialosi
Attorney, Agent, or Firm—Jeffrey S. LaBaw; Melvin A. Hunn; Andrew J. Dillon

[57] ABSTRACT

A method is described for substantially concurrently performing entity authentication operations and short-lived secret key distribution operations over an insecure communication channel between communication partners, wherein authenticity of communication partners is determined by possession of the long-lived shared secret key. The method includes a number of steps. Data flows are exchanged between the communication partners to define a composite key. At least a portion of the data flows have been encrypted or otherwise masked in a manner which utilizes the long-lived shared secret key. At least one authentication tag is passed between communication partners over the communication channel. The at least one authentication tag is based at least partially upon the composite key. The authentication tag is utilized to determine the authenticity of at least one communication partner.

24 Claims, 4 Drawing Sheets

METHOD AND APPARATUS FOR ENTITY AUTHENTICATION AND KEY DISTRIBUTION SECURE AGAINST OFF-LINE ADVERSARIAL ATTACKS

BACKGROUND OF THE INVENTION

1. Technical Field

The present invention relates in general to techniques for securing the flow of information from an adversary, and in particular to techniques for verifying the identity of a communication partner and distributing session keys among communication partners.

2. Description of the Related Art

With the increased utilization of distributed data processing systems to share and communicate sensitive and confidential information, the computing and relating industries are paying significantly increased attention to improving and refining known techniques for securing data which is communicated over insecure communication channels such as telephone lines and electromagnetic-based communication systems such as cellular networks.

Three long standing industry goals exist. First, it is important that the particular communication partners in a distributed data processing system be able to authenticate the identity of other communication partners within the distributed data processing system. Commonly, this entity authentication requirement is met by depositing a long-lived and shared secret key at two or more communication nodes in the data processing system. For example, a user may possess a secret password which is also known by a host computer within the data processing system. When authentication is desired, a protocol is executed which, based on this shared secret, serves to authenticate one party to the other, or each party to the other. For example, the long-lived and shared secret key can be utilized in a conventional encryption operation such as a DES encryption. Most commonly, the communication partner desiring authentication of another partner directs a "challenge" to the other partner which is in the form of a random bit stream. The partner for which authentication is sought typically performs an encryption operation upon the challenge bit stream utilizing the long-lived and shared secret key, and then passes this data back to the challenging party. This data is decrypted to determine whether the responding party has possession or knowledge of the long-lived and shared secret key, or the challenger utilizes an encryption engine to generate the response he or she is seeking, and then compress the response to the correct answer. This operation may be performed unilaterally or bilaterally. In a unilateral operation, one party obtains authentication of the identity of another party within the distributed data processing system. In a bilateral entity authentication procedure, both parties typically issue a "challenge" to the other party, which must be responded to properly before communication can be allowed between the communication nodes.

The second broad goal of the industry is to provide techniques for generating and distributing short-lived and secret session keys which are shared by two or more communication partners in a distributed data processing system after authentication of the various communication partners has been obtained. In accordance with the present invention, the distribution of the short-lived and secret session key is tightly coupled with the entity authentication operations. The utilization of a session key ensures that the long-lived and shared secret key need not be used more often than is absolutely necessary, and it is further useful to guard against "replay attacks" across the communication sessions which communicating partners may engage in. Typically, the long-lived and shared secret key is utilized only during entity authentication operations. Immediately after authentication of the communicating parties is obtained, the short-lived and secret session key is distributed and utilized to allow communication back and forth between the parties in that particular session, to be authenticated, encrypted, or both.

The third broad industry goal is that of assuring a communicating party which has received data over an insecure line that the data has not been modified in transit. Often, such message authentication is achieved by having the originating party compute a short "authentication tag" as a function of the message being transmitted and the secret key shared by the communicating partners. This authentication tag is typically appended to the data stream which is being communicated between the parties. Upon receipt of the data stream and authentication tag, the receiving party analyzes the authentication tag by performing the same operations which were performed upon the data set by the sending party to generate its own authentication tag. If the sender's authentication tag matches identically the receiver's authenticated tag, then the recipient of the data can be assured that the data has not been altered in any way. This type of protection prevents an active adversary from entering the insecure communication channel and meddling with the data.

In devising security systems for allowing secure communication between communication partners, it is generally assumed that an adversary may be (1) passive and perform eavesdropping operations to monitor and record all communications between the parties in the distributed data processing system, or (2) active and actually participate in communications within the distributed data processing system by requesting access to data or resources and issuing or responding to authentication challenges. The capabilities of an active adversary are taken to include all those of a passive one. One type of adversarial attack which is contemplated is that of an initial passive period of monitoring and recording activities, followed by a period of off-line analysis and manipulation of the data obtained during monitoring activities, followed by a brief interval of activity wherein access to data and data processing resources is requested. Alternatively, the adversary may merely engage in passive monitoring and recording activities followed by analysis and attempts to crypt analyze portions of the data, particularly in an attempt to recover the session key, which is then utilized to decrypt any encrypted data which was transmitted between the parties and recorded by the adversary.

Since it is more difficult to detect a passive adversary, who only monitors, records, and then later performs off-line analysis, than an active adversary who is forced to interact with one or more authorized communication parties, adversaries favor a passive mode of attack. A still more significant reason off-line analysis is preferred by an adversary is the bandwidth limitations present in the communication channel: the adversary can only speak to partners at the rate which is defined and allowed by the system architecture; but off-line analysis can be performed at the rate of the adversary's computing resources. Thus, it is especially important to provide data security systems which prevent an adversary from gathering useful data during passive activities. It is especially important that security systems be designed to prevent a compromise of the long-lived and secret shared key as well as any short-lived and secret session keys which may have been utilized. It is especially important that the security system prevent the passive adversary from correctly guessing the long-lived or short-lived keys during off-line analysis, and then confirming the veracity of the guess during off-line activities. It is important that the adversary be forced to actively engage one or more communication parties in order to confirm the accuracy of a correctly guessed key. This type of protection is identified as "security against off-line attack", and can be best understood with respect to the specific example of one type of off-line attack, which is known as a "dictionary attack", which will be discussed here below.

Dictionary attacks are effective because the long-lived key used for the entity authentication is based on a user's password and these passwords are often chosen poorly. Many data processing systems allow the human operators to select their own passwords. Of course, the humans select familiar words typically, in order to be better able to remember the pass word in the future. It is not uncommon for users to use proper names or common nouns or verbs as passwords. Since human language is a fairly small and static set, it is possible for a passive adversary to iteratively guess the candidate of one or more particular languages and then see if such guess "explains" the transcript recorded in an earlier session during eavesdropping activity. When a match is identified, the correct password is typically recovered as is any short-lived key whose distribution had been based on this password. Of course, this type of off-line attack can be computationally demanding if the size of the dictionary is very large, but the significant advances which are continually being made in processing speed and power make such off-line attacks practical even if the dictionary contains many millions of words.

SUMMARY OF THE INVENTION

It is one objective of the present invention to provide a security system which is not susceptible to off-line attacks, such as a dictionary attack, by forcing an adversary to test the accuracy of each guess of a candidate key interactively with one or more communication parties.

It is another objective of the present invention to provide a security system which minimizes the number of communication flows which must pass between communicating parties during entity authentication operations and key distributions.

It is yet another objective of the present invention to provide a security system which is less reliant on encryption and decryption operations than existing prior art security systems, and which is much more reliant upon transforms, such as message authentication codes and encryption hash functions, which are applied to a plurality of parameters including the long-lived and secret shared key, or its derivatives, in order to maximize system security.

It is still another objective of the present invention to provide a security system which utilizes one or more computationally irreversible transforms which are applied to a plurality of parameters, including the long-lived and secret shared key or its derivatives, to accomplish entity authentication, in lieu of the more conventional utilization of encryption techniques such as the DES algorithm. In the preferred embodiment, this type of authentication-tag-based entity authentication is utilized in combination with an exponential key exchange. The present technique can be utilized to perform unilateral or multilateral authentication, involving two parties or three parties.

These and other objectives are achieved as is now described. A method is provided for authenticating a communication partner on an insecure communication channel, wherein the authenticity of a communication partner is determined by possession of a long-lived shared secret key. The method includes a number of steps. First, a "composite key" is exchanged in data flows between communication partners, wherein at least a portion of the data flows has been encrypted or otherwise masked in a manner which utilizes the long-lived shared secret key. Next, at least one authentication tag is passed between communication partners, with the at least one authentication tag being based at least partially upon the composite key. Finally, the authentication tag is utilized by at least one communication partner to determine authenticity of another communication partner. In the preferred embodiment of the present invention, the at least one authentication tag is defined by a transform which includes at least one of (1) a message authentication code which is keyed by said long-lived shared secret key and taken over a plurality of parameters, (2) a cryptographic hash function taken over the long-lived shared secret key and a plurality of other parameters, and (3) the encryption or message authentication code keyed by said long-lived key and taken over the cryptographic hash of a plurality of parameters. In one particular embodiment of the present invention, wherein mutual authentication is desired between first and second parties, the parties first exchange portions of a composite key using a conventional secret key exchange, except that some or all of the flows of this exchange are encrypted, as is described in U.S. Pat. No. 4,241,599 to Bellovin et al. Then, first and second authentication tags are exchanged between the first and second communication parties. The authentication tags are analyzed to perform an entity authentication of the first and second communication partners. In one specific embodiment of the present invention, at least one of the first and second authentication tags is communicated between the first and second communication partners along with at least a portion of the composite session key, in order to minimize the number of communication flows between the first and second communication partners. In particular embodiments of the present invention, the authentication tags are generated by applying a hash function to a plurality of parameters, which include the newly-distributed session key, and then using as the authentication tag a prefix of this hash function.

While the present invention is described with reference to one principal commercial application in distributed data processing systems, it is clear that the present invention is of general applicability and can be utilized to communicate messages in any conceivable communication channel, and that it is particularly useful for secret telecommunications.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
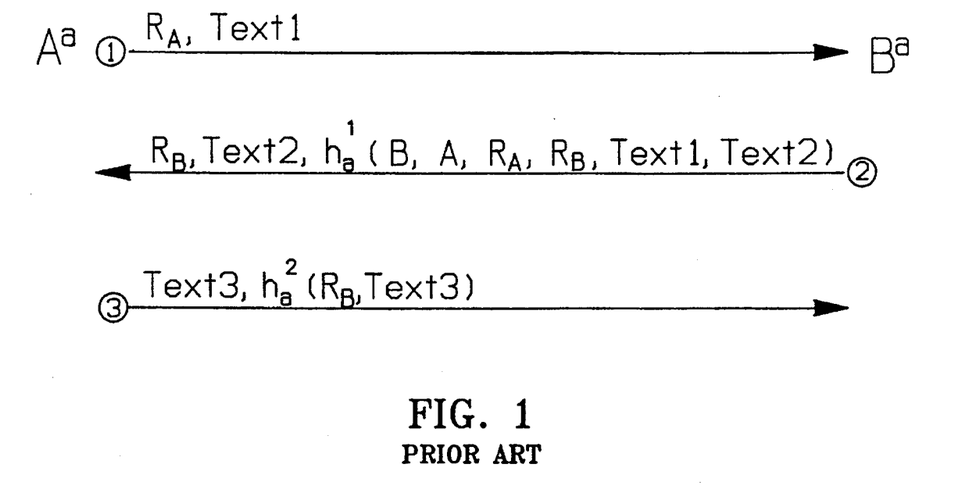
FIG. 1 depicts a prior art two-party, message authentication.
Figure 2:
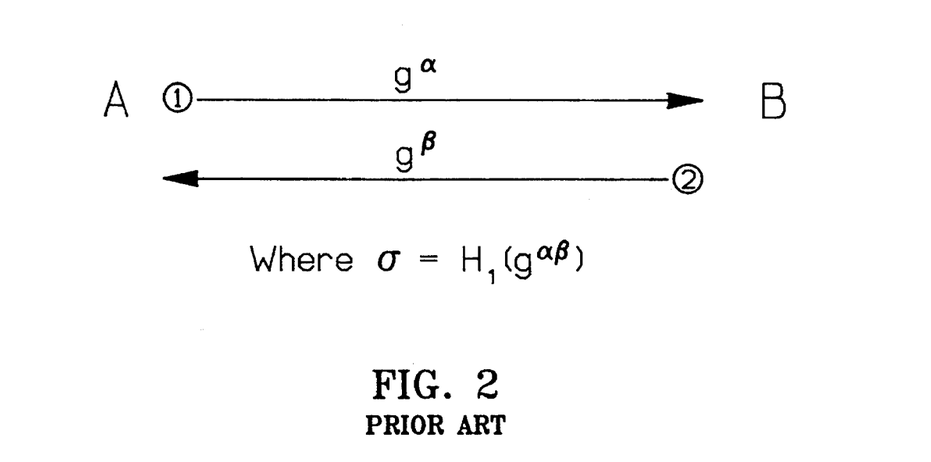
FIG. 2 depicts a prior art conventional key exchange, exponential key exchange, such as the Diffie-Hellman key exchange.
Figure 3:
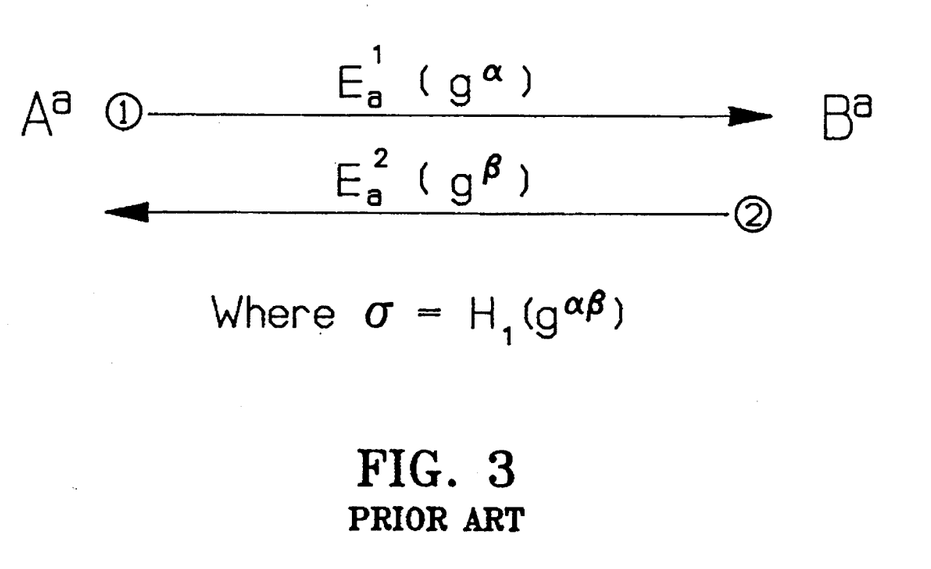
FIG. 3 depicts a prior art key exchange in accordance with the teachings of Bellovin and Merritt.
Figure 4:
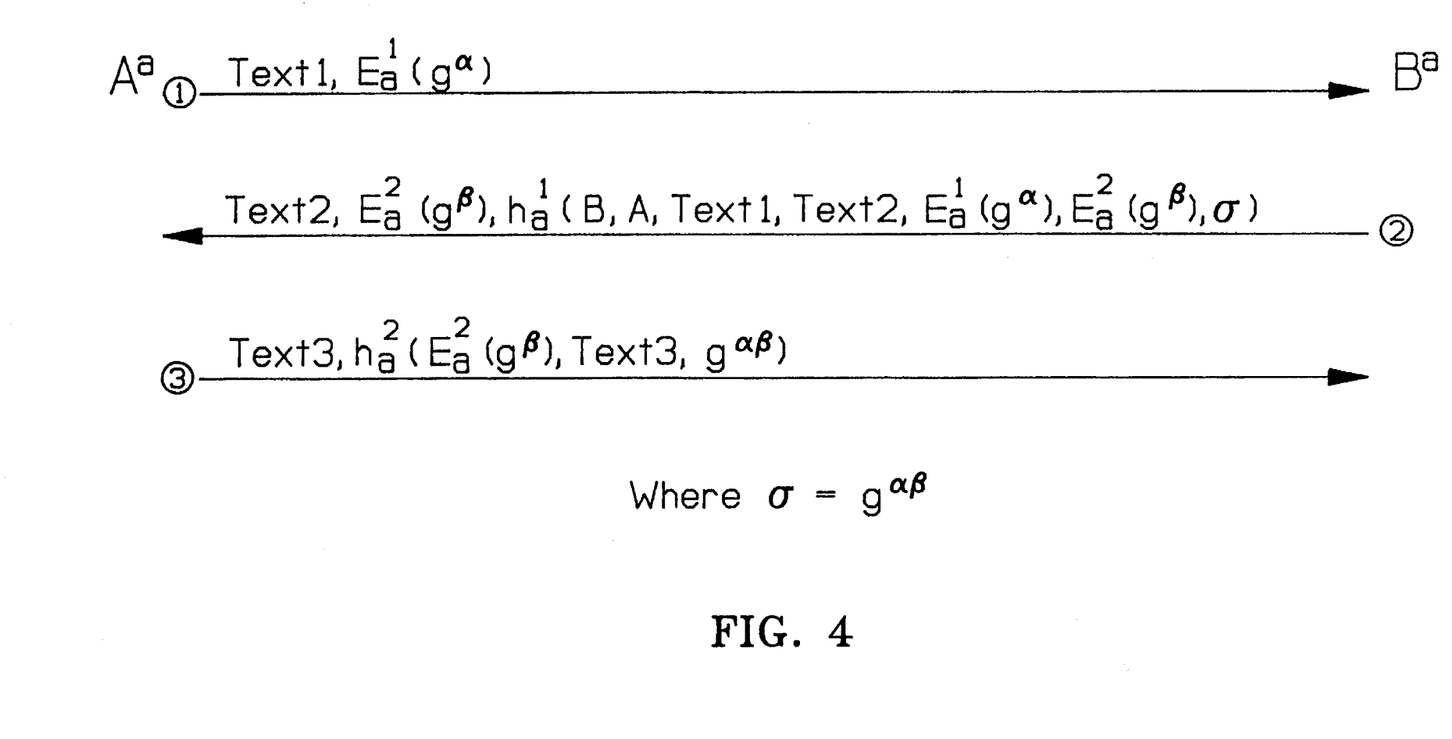
FIG. 4 depicts a two-party, mutual authentication operation in accordance with one embodiment of the present invention.
Figure 5:
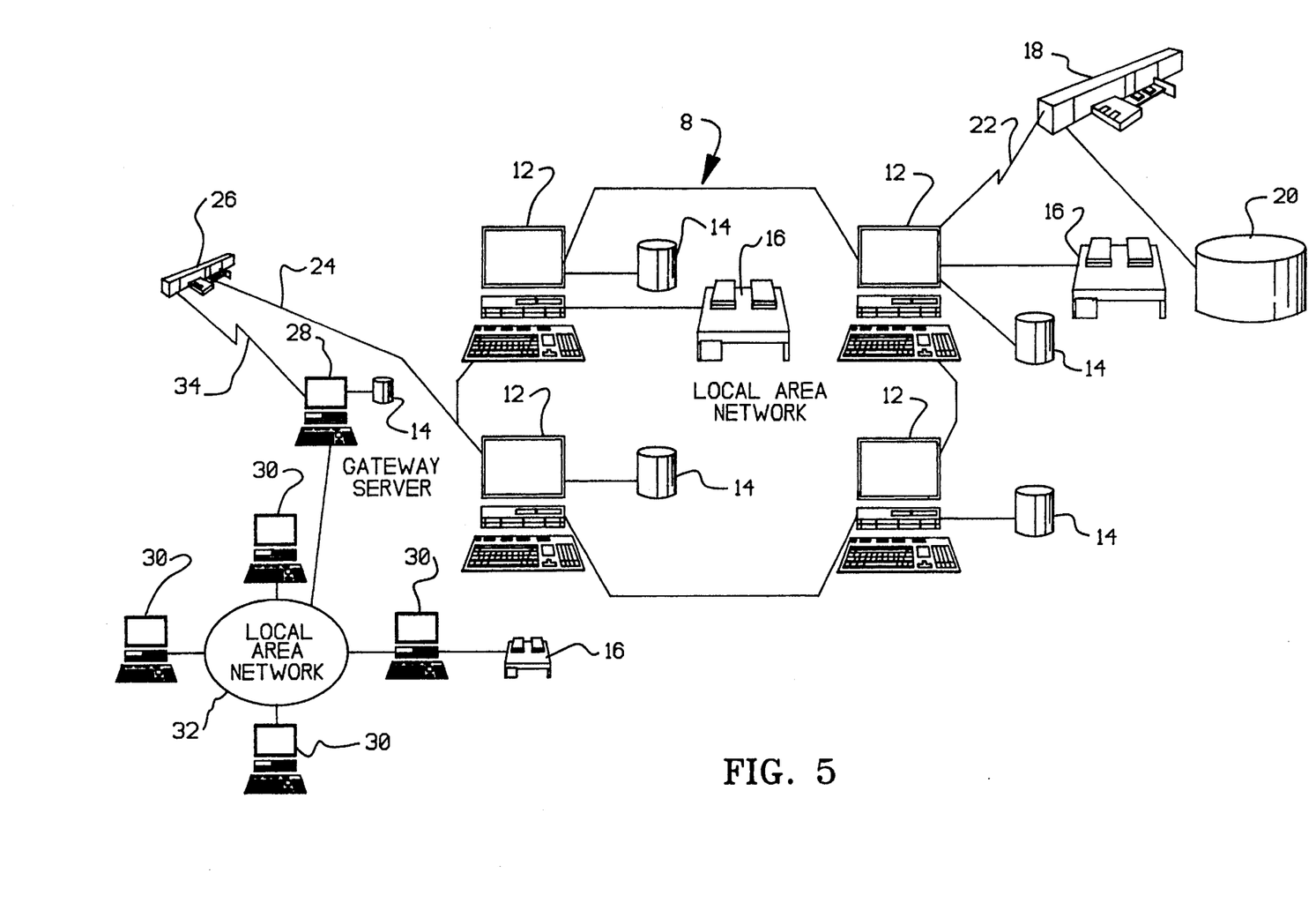
FIG. 5 depicts a distributed data processing system which can be programmed to perform the authentication operation of the present invention.

FIGS. 1, 2, and 3 provide views of prior art techniques for securing the communication of data. An understanding of these prior art techniques will facilitate an understanding of the preferred embodiments of the present invention which are depicted in FIGS. 4 and 5.

In FIG. 1, a prior art, three-pass message authentication technique is depicted. As is shown, A and B are the communication partners, which share a long-lived and shared secret key a. Communication partners A and B communicate over an insecure communication channel. Three data flows are depicted in FIG. 1. The first data flow is from communication partner A to communication partner B, and includes a random bit string $R_a$ which represents an entity authentication challenge. The first flow also includes an arbitrary text string Text1. Communication partner B responds to the first communication flow by directing to communication partner A a random bit string challenge $R_B$ an arbitrary text string Text2, and a bit string which is the result of a transform $h^1$, which is keyed with the long-lived and shared secret key a, and taken over a plurality of further data items including an identification of communication partners A, B, the authentication challenges $R_A$, $R_B$, which have been generated by the communication partners A, B, and Text2.

Since communication partner A possesses the long-lived and shared secret key a, then she can utilize the authentication challenge $R_B$ from communication partner B to generate a bit stream which is identical (if the second flow is computed correctly and received as it is transmitted) to that provided by communication partner B as a result of utilization of transform $h_a^1$. At the end of communication flow 2, communication partner A can be certain that communication partner B is "authentic", since possession of the long-lived and shared secret key is required for communication partner B to generate a bit stream through the utilization of transform $h_a^1$ which is identical to that generated by communication partner A.

In the third communication flow, communication partner A directs Text3, and the result of the application of transform $h_a^2$ to the authentication challenge $R_B$ and Text3. Communication partner B can utilize the long-lived and shared secret key a, the authentication challenge $R_B$, Text3, and transform $h^2$ to generate a bit stream which is compared to that provided by communication partner A. If the bit streams are identical, then communication partner B can be certain that communication partner A is "authentic". The techniques depicted in FIG. 1 are more fully discussed in a publication by M. Bellare and P. Rogaway, entitled "Entity Authentication and Key Distribution", published in *The Proceeding of Crypto '93*, by Springer-Verlag, which is incorporated here fully as is set forth herein. Basically, in the technique of FIG. 1, conventional entity authentication challenging techniques are combined with conventional message authentication techniques.

FIG. 2 depicts a conventional key exchange in accordance with the teachings of W. Diffie, and M. Hellman, in an article entitled "New Directions in Cryptography", *IEEE Transactions On Information Theory*, IT-22, No. 6, 1976, which is incorporated herein as if fully set forth. This technique may be identified specifically as a Diffie-Hellman key exchange. The purpose of this technique is to publicly exchange information that can be combined to generate a shared secret key which can be utilized for particular communication sessions. In accordance with this protocol, communication partner A directs to communication partner B a bit stream which is generated by expotentiating a publicly-known base g to a secretly selected power or, selected from a publicly-known group such as the multiplicative group Modulo a fixed prime number p. Communication partner El responds in communication flow 2 by directing to communication partner A a bit stream which is generated by expotentiating a publicly-known base g to a secretly selected power β, selected from the same publicly-known group from which α was selected. The shared secret σ, is generated by utilization of the information passed between communication partners A, B in the two communication flows. As is shown in FIG. 2, the shared secret σ, is a function of a transform H as applied to the exponential product of $g^\alpha$ and $g^\beta$. Preferably, the values for α, and β are randomly selected by communication partners A, B from a predefined set of integers.

The Diffie-Hellman key exchange is useful only over communication channels which may be subject to passive adversaries, but not communication channels which are subject to active adversaries. In other words, if the communication channel is susceptible to interaction by the adversary, then the Diffie-Hellman key exchange protocol is not very useful, since the adversary can pose as either communication partner A or communication partner B and initiate the generation of a shared secret, which can then be utilized to obtain information from an authorized party.

Conventional key exchange techniques like that of the Diffie-Hellman key exchange protocol of FIG. 2 have been elaborated on by Bellovin and Merritt in the paper entitled "Encrypted Key Exchange: Password Based Protocol Secure Against Dictionary Attacks", proceedings of the *IEEE Symposium On Research And Security And Privacy*, 1992, which is also the subject matter of U.S. Pat. No. 5,241,599, issued on Aug. 31, 1993 to Bellovin et al., and which is entitled "Cryptographic Protocol For Secure Communications", both of which are incorporated herein by reference fully. The broad concept behind the approach of Bellovin and Merritt is depicted in FIG. 3. As is shown, communication partners A, B share a long-lived secret key a. Two communication flows are depicted in FIG. 3, although additional communication flows are also possible. In the first communication flow, A applies a randomly-selected and secret a (an authentication key picked from a fixed underlying group), as an exponent to the publicly-known base g, and then applies an encryption of masking transform $E_a^1$ which is keyed with the long-lived and shared secret key a to the bit stream representative of $g^\sigma$. In the second communication flow, communication partner B responds by applying a randomly-selected β as an exponent to the base g, and then applies a transform $E_a^2$ to the bit stream which is generated by $g^\beta$. In accordance with this technique, the key which has been generated as a result of this interaction is σ which is equal to $H_1(g^{\alpha\beta})$, for some function $H_1$. In this protocol the transforms $E^1$ and $E^2$ can be exclusive-or operations or any other masking operation. Utilizing this technique Bellovin and Merritt have devised a protocol which can be utilized to periodically generate short-lived session keys, in accordance with the Diffie-Hellman key exchange, which are secure against both active and passive adversaries. The information contained in communication flows 1 and 2 is not susceptible to eavesdropping, since the exchanged data is encrypted with a transform which is keyed by the long-lived and shared secret key a, and is thus not susceptible to passive off-line attacks such as a dictionary attack.

One embodiment of the present invention will be described now with reference to FIG. 4. The present invention presents a security protocol which can be utilized to simultaneously obtain the following results:

(1) to allow for entity authentication between two or more parties in a communication system;

(2) to employ tags, in lieu of encryption, to achieve the entity authentication for messages communicated between the parties in a communication system;

(3) to allow the two or more parties in the communication system to distribute a short-lived session key; and (4) wherein the objectives of entity authentication and session key distribution are accomplished in a minimal number of communication flows between the multiple parties in the communication system, and which in particular is accomplished by a substantially simultaneous pursuit of the goals of entity authentication, and key distribution in each particular data flow; and (5) wherein the communication system is secure from off-line attacks, and in particular is secure against dictionary attacks; and (6) wherein the security system provides perfect forward secrecy, preventing an adversary from utilizing knowledge of the long-lived key to compromise the secrecy of recorded sessions.

As is shown in FIG. 4, this preferred embodiment requires three consecutive data flows between communication parties A, B, which share a long-lived secret a; however, in alternative embodiments, the objectives of the present invention could be achieved in a greater number of data flows, such as, for example four or five data flows, by separating particular portions of the data flows for separate communication.

In the scenario of FIG. 4, communication partner A is trying to pass Text1 to communication partner B. Communication B will respond by directing Text2 to communication partner A. Then communication partner A will reply to communication partner B by directing Text3 to communication B. During this exchange of data, communication partners A, B want to make certain that each communication is being generated by an "authentic" source, and that the textual message or data has not been altered in any way by an adversary. They also want to distribute a fresh session key, to be used for subsequent message authentication and/or encryption. To accomplish these goals, in the first communication flow, communication partner A directs Text1 and an encrypted or otherwise masked bit stream to communication partner B. More specifically, communication partner A selects a, in accordance with the Diffie-Hellman key exchange which is depicted in FIG. 2, and described above. σ is selected at random between 0 and p-2 from the multiplicative group of integers modulo p. The randomly-selected 7 is applied as an exponent to a publicly known base g, and the numeric value of $g^\sigma$ is subject to transform $E^1$, which is keyed with the long-lived and shared secret key a' which can comprise an exclusive-or operation performed utilizing gσ and the long-lived and shared key a. In the communication flow this operation is represented as $E_a^1$. Therefore, the first flow of a conventional secret key exchange is masked in accordance with the transform $E_a^1$.

In the second communication flow, communication partner B directs to communication partner A a textual portion Text2, and two other components. The first component is a second flow of a conventional key exchange, such as the Diffie-Hellman key exchange model. More specifically, communication partner B randomly selects β from the set of integers from which σ was selected. The randomly-selected σ is applied as an exponent to the publicly-known base g. The numeric value of $g^\beta$ may be subjected to transform $E^2$ which is keyed by the long-lived and shared secret key a and which is thus represented in communication flow 2 as $E_a^2$. The second component is the result of applying masking transform $h^1$, which is keyed with the long-lived and shared secret key a, and which is applied to a plurality of parameters including an identification of communication party B, an identification of communication party A, the textual portion Text1 which was transmitted in the first data flow, the textual portion Text2 which was transmitted in the second data flow, and the masked exchange of key portions defined by $E_a^1(g^\alpha)$, and $E_a^2(g^\beta)$. Additionally, σ, is also the subject of the transform of $h_a^1$; σ is defined, in accordance with the Diffie-Hellman protocol of FIG. 2, as $g^{\alpha\beta}$ mod p.

In this manner, in the first two communication flows, communication partners A, B, exchange two textual portions, as well as two flows which together define the short-lived (session) key which is defined as σ; however, the key flows are masked to render them useless to an adversary who does not have access to the long-lived and shared secret key a. In the second communication flow, the bit stream generated by transform $h_a^1$ serves a dual function: to perform a message authentication procedure on the data of Text1 and Text2, and to authenticate communication partner B to communication partner A (by having the encryption transform $h^1$ be applied to a group of parameters which includes σ or a).

In the third communication flow, textual portion Text3 is communicated by communication partner A to communication partner B. Additionally, masking transform $h^2$ is keyed with the long-lived and shared secret key a, and is applied to at least three parameters, including the transformed composite key portion $g^\beta$, which is subjected to the transform in accordance with $E_a^2$, the textual portion Text3, and σ which represents the session key. As a result of this third communication flow, communication partner A has authenticated herself to communication partner B by including σ in the parameters which are subjected to the encryption transform $h_a^2$. Simultaneously, the data contained in Text3 is assured to be accurate, since transform $h_a^2$ operates as a message authentication transform.

In the preferred embodiment of the present invention, a plurality transform function of the transforms $E^1$, $E^2$, $h^1$, and $h^2$. For example, the of conventional transforms may be utilized to perform the encryption or masking encryption or masking transform of $E_a^1$ could be the exclusive-oring of the long-lived and secret shared key a against $g^\sigma$. The exclusive-oring of the long-lived and shared secret key a against the bit stream of $g^\beta$ could be utilized as the masking transform $E^2$.

In accordance with the present invention, the encryption or masking transforms $h^1$ and $h^2$ are preferably either (1) a message authentication code operation, which is keyed by the long-lived and shared secret key a applied to a plurality of parameters including σ or a composite key portion, or (2) a cryptographic hash function which is keyed with the long-lived and shared secret key a and applied to a plurality of parameters including the composite session key σ, or a portion of the composite session key, or (3) the encryption or message authentication code keyed by the long-lived key a and taken over the cryptographic hash of a plurality of parameters.

In the preferred embodiment of the present invention, transforms $h_a^1$ and $h_a^2$ are either conventional message authentication code techniques or conventional hash functions. Many mechanisms are available to accomplish the objectives of message authentication code operations, but some of the principal ones include:

(1) the prefix of the last word of the CBC-encryption using a block cipher α (that is, cipher block chaining) of a particular bit stream under a long-lived and secret key a, denoted as "$CBC_aC(x)$";

(2) the prefix of the cryptographic hash of a particular bit stream and the long-lived and shared secret key a, denoted as "hash (x, a)";

(3) a combination of the operation of No. 1 and the operation of No. 2 to drive the prefix of a cipher block chaining operation which is performed upon a cryptographic hash function of operation No. 2, which is denoted "$CBC_a$(hash(x,a)); and (4) a combination of a hash operation and an encryption operation (such as the DES algorithm) which can be denoted as "Encryption (hash(x))".

MESSAGE AUTHENTICATION CODE OPERATIONS

Message authentication codes (MACs) are utilized in cryptography to assure the authenticity of communications. These types of operations are frequently referred to as "message authentication operations". Typically, message authentication operations permit a receiver to validate a message's origin and destination, contents, timeliness, and sequence relative to other messages flowing between communicants.

While a variety of algorithms may serve to perform the method authentication code (MAC) operations, the best known and official scheme is 8 documented in the DES MODES OF OPERATION publication, more specifically identified as the Federal Information Processing Standards Publication, FIPS PUB 81, published by the National Bureau of Standards on Dec. 2, 1980. Preferably, the Cipher Block Chaining (CBC) mode is used to encrypt plaintext, which must be padded (for example, with zero bits) if necessary to make it a multiple of sixty-four bits in length. The MAC consists of the last k bits of cyphertext, the rest of which is discarded. This process is discussed in an article by C. H. Meyer and S. M. Matyas, entitled "Cryptography: A New Dimension in Computer Data Security", published by John Wiley & Sons, of New York, in 1982. The utilization of the DES algorithm in the Cipher Block Chaining mode of operation demonstrates a well-established forward error propagating property; therefore, the change of even so much as a single bit in the plaintext would cause an unpredictable change in every bit in the MAC with the probability of fifty percent for each bit. Utilizing a MAC which is k-bits long, and the MAC is transmitted along with the associated message to be authenticated, and that portion is recomputed on the received message at the destination, then there is only a probability of $2^{-k}$ that the received MAC matches the recomputed MAC in the event that the transmitted message has been tampered with. This probability can be made as small as desired by choosing k sufficiently large.

In the preferred embodiment of the present invention, the Cipher Block Chaining operation is utilized to generate the message authentication code (MAC). The DES operation which is utilized in the Cipher Block Chaining is keyed with a particular secret key. In the embodiment discussed herein the keying of the message authentication code (MAC) operation with a secret key ensures that the authentication tag produced as a result of the message authentication code operation serves to authenticate the one or more communication parties.

An article published in the September 1985 issue of IEEE Communications Magazine, Volume 23, No. 9, entitled "Message Authentication" by R. R. Jueneman, S. M. Matyas, and C. H. Meyer sets forth alternatives to the Cipher Block Chaining operation, and is incorporated herein fully as if set forth.

APPLICATIONS OF THE AUTHENTICATION PROTOCOLS

The protocols of the present invention may be utilized in a distributed data processing system to authenticate one or more communication partners in the distributed data processing system. In such an environment, 18 one or more data processing units perform the functions of the trusted intermediary. FIG. 5 depicts a distributed data processing system 8 which may be programmed to perform the protocols described herein.

As is shown in FIG. 5, distributed data processing system 8 may include a plurality of networks, such as local area networks (LAN) 10 and 32, each of which preferably includes a plurality of individual computers 12, 30, respectively. Of course, those skilled in the art will appreciate that a plurality of intelligent work stations coupled to a host computer may be utilized for each such network. As is common in such distributed data processing systems, each individual computer may be coupled to a storage device 14 and/or a printer/output device 16. One or more such storage devices 14 may be utilized, in accordance with the method and system of the present invention, to store various "groupware" applications or documents which may be simultaneously or successively accessed and processed by multiple users. Furthermore, one or more systems may be included for managing data processing resources, including the groupware applications and documents, in accordance with conventional technologies.

Still referring to FIG. 5, it may be seen that distributed data processing network 8 may also include multiple mainframe computers, such as mainframe computer 18, which may be preferably coupled to local area network (LAN) 10 by means of communications link 22. Mainframe computer 18 may be coupled to a storage device 20 which may serve as remote storage for local area network (LAN) 10 and may be coupled via communications controller 26 and communications link 34 to a gateway server 28. Gateway server 28 is preferably an individual computer or intelligent work station (IWS) which serves to link local area network (LAN) 32 to local area network (LAN) 10.

As discussed above with respect to local area network (LAN) 32 and local area network (LAN) 10, a plurality of data objects, application programs, and data files, groupware programs, or groupware documents may be stored within storage device 20 and controlled by mainframe computer 18, as resource manager or library service for the data objects and documents thus stored. Those skilled in the art will appreciate that it is often desirable to permit simultaneous or successive, as well as restricted, access to such data objects, application programs, data files, groupware applications, or groupware documents to allow for the beneficial synergistic effects of group work. Additionally, those skilled in the art will appreciate that mainframe computer 18 may be located a great geographical distance from local area network (LAN) 10; and, similarly, local area network (LAN) 10 may be located a substantial distance from local area network (LAN) 32. That is, local area network (LAN) 32 may be located in California, while local area network (LAN) 10 may be located in Texas, and mainframe computer 18 may be located in New York.

OTHER SIGNIFICANT ADVANTAGES

While the present invention provides a secure and efficient means for authenticating communication partners and simultaneously distributing short-lived session keys to the communication partners, it also includes several significant advantages. The present invention provides "perfect forward secrecy". This means that, if an adversary comes into possession of the long-lived secret key, then short-lived session keys which were distributed utilizing the long-lived secret key are not compromised. In other words, knowledge or possession of the long-lived key will not yield the adversary any advantage with regard to short-lived keys. Therefore, recorded sessions cannot be "cracked" unless the short-lived session key is also within the knowledge or possession of the adversary. One significant additional advantage is that the protocol of the present invention is completely secure against "interleaving attacks", wherein an adversary poses as a communication partner to engage multiple communication partners, successively or sequentially, in order to obtain a sufficient amount of information from one particular party, and then use that information to gain an advantage against another communication party. This type of interleaving attack is typically referred to in the literature as a "session" attack. In its most common form, the active adversary initiates communication with two different communication partners, and uses communications received from one partner to enter into a key exchange with another partner. The present invention is completely secure against this type of attack.

While the invention has been particularly shown and described with reference to a preferred embodiment, it will be understood by those skilled in the art that various changes in form and detail may be made therein without departing from the spirit and scope of the invention.

What is claimed is:

1. A method of authenticating a communication partner in an insecure communication channel wherein authenticity of communication partners is determined by possession of a long-lived shared secret key, comprising the method steps of:
    (a) exchanging data flows between communication partners, to define a composite key, wherein at least a portion of said data flows has been encrypted or otherwise masked in a manner which utilizes said long-lived shared secret key;
    (b) passing at least one authentication tag between said communication partners, wherein said at least one authorization tag is defined by a transform taken over a plurality of parameters and at least partially based on said composite key, said transform including at least one of (i) a message authentication code which is keyed by said long-lived shared secret key; (ii) a cryptographic hash function taken over said long-lived shared secret key; and (iii) a masking operation involving said long-lived shared secret key; and
    (c) utilizing said authentication tag to determine authenticity of at least one communication partner.

2. A method of authenticating a communication partner, according to claim 1:
    (d) wherein a first communication partner directs to a second communication partner a first exponential component of said composite key;
    (e) wherein said second communication partner directs to said first communication partner a second exponential component of said composite key.

3. A method of authenticating a communication partner, according to claim 2:
    (f) wherein said first exponential component includes a public base and a random and secret exponent selected by said first communication partner from a defined group of integers.

4. A method of authenticating a communication partner, according to claim 2:
    (f) wherein said second exponential component includes a public base and a random and secret exponent selected by said second communication partner from a defined group of integers.

5. A method of authenticating a communication partner, according to claim 2:
    (f) wherein said first exponential component includes a public base and a random and secret exponent selected by said first communication partner from a defined cyclic multiplicative group of integers; and
    (g) wherein said second exponential component includes a public base and a random and secret exponent selected by said second communication partner from a defined cyclic multiplicative group of integers.

6. A method of authenticating a communication partner, according to claim 1:
    (d) wherein a first communication partner directs to a second communication partner a first authentication tag which allows said second communication partner to authenticate said first communication partner; and
    (e) wherein said second communication partner directs to said first communication partner a second authentication tag which allows said first communication partner to authenticate said second communication partner.

7. A method of authenticating a communication partner, according to claim 6:
    (f) wherein at least one of said first and second authentication tags is communicated between said first and second partners concurrent with data flows which establish said composite key, in order to minimize the number of communication flows between said first and second communication partners.

8. A method of authenticating a communication partner in an insecure communication channel in a distributed data processing system wherein authenticity of communication partners is determined by possession of a long-lived shared secret key, comprising the method steps of:
    (a) exchanging data flows between communication partners to define a composite key, in said distributed data processing system wherein at least a portion of said data flows has been encrypted or otherwise masked in a manner which utilizes said long-lived shared secret key;
    (b) passing at least one authentication tag between said communication partners, wherein said at least one authorization tag is defined by a transform taken over a plurality of parameters and at least partially based on said composite key, said transform including at least one of (i) a message authentication code which is keyed by said long-lived shared secret key; (ii) a cryptographic hash function taken over said long-lived shared secret key; and (iii) a masking operation involving said long-lived shared secret key; and (c) utilizing said authentication tag to determine authenticity of at least one communication partner.

9. A method of authenticating a communication partner, according to claim 8:

(d) wherein a first communication partner in said distributed data processing system directs to a second communication partner in said distributed data processing system a first exponential component of said composite key;

(e) wherein said second communication partner in said distributed data processing system directs to said first communication partner in said distributed data processing system a second exponential component of said composite key.

10. A method of authenticating a communication partner, according to claim 9:

(f) wherein said first exponential component includes a public base and a random and secret exponent selected by said first communication partner from a defined group of integers.

11. A method of authenticating a communication partner, according to claim 9:

(f) wherein said first exponential component includes a public base and a random and secret exponent selected by said first communication partner from a defined group of integers.

12. A method of authenticating a communication partner, according to claim 9:

(f) wherein said first exponential component includes a public base and a random and secret exponent selected by said first communication partner from a defined cyclic multiplicative group of integers;

(g) wherein said second exponential component includes a public base and a random and secret exponent selected by said second communication partner from a defined cyclic multiplicative group of integers.

13. A method of authenticating a communication partner, according to claim 8:

(d) wherein a first communication partner in said distributed data processing system directs to a second communication partner in said distributed data processing system a first authentication tag which allows said second communication partner to authenticate said first communication partner; and (e) wherein said second communication partner in said distributed data processing system directs to said first communication partner a second authentication tag which allows said first communication partner to authenticate said second communication partner.

14. A method of authenticating a communication partner, according to claim 13:

(f) wherein at least one of said first and second authentication tags is communicated between said first and second communications partners concurrent with data flows which establish said composite key, in order to minimize the number of communication flows between said first and second communication partners.

15. A method of authenticating a communication partner over an insecure communication channel wherein authenticity of communication partners is determined by possession of a long-lived shared secret key, comprising the method steps of:

(a) short-lived distributing to said communication partners a composite key in data flows between communication partners;

(b) passing at least one authentication tag between said communication partners, wherein said at least one authorization tag is defined by a transform taken over a plurality of parameters and at least partially based on said composite key, said transform including at least one of (i) a message authentication code which is keyed by said long-lived shared secret key (ii) a cryptographic hash function taken over said long-lived shared secret key; and (iii) a masking operation involving said long-lived shared secret key; and (c) utilizing said authentication tag to determine authenticity of at least one communication partner.

16. A method of authenticating a communication partner according to claim 15, wherein said step of distributing includes the substeps of:

computing, in behalf of a first communication partner, a value for $g \alpha$ for a particular $g$ and a value for $\alpha$ secretly selected from a predefined group;

computing, on behalf of a second communication partner, a value for $g \beta$ for said particular $g$ and a value for $\beta$ secretly selected from a predefined group;

communicating said value for $g \beta$ from said first communication partner to said second communication partner;

communicating said value for $g \beta$ from said second communication partner to said first communication partner;

generating a short-lived shared secret key $g \alpha\beta$ for use in securing communications between said first and second communication partners over said insecure communication channel.

17. A method of authenticating communication partners, according to claim 16, further comprising:

masking said value for $g \alpha$ and $g \beta$ during communications between said first and second communication partners.

18. A method of authenticating communication partners, according to claim 17, wherein said step of masking comprises:

masking said value for $g \alpha$ by performing a masking operation between said value for $g \alpha$ and a shared secret key;

masking said value for $g \beta$ by performing a masking operation between said value for $g \beta$ and a shared secret key.

19. A method of authenticating communication partners, according to claim 18, wherein said masking operation comprises an exclusive-or operating.

20. A method of authenticating communication partners according to claim 18, wherein said shared secret key comprises said long-lived shared secret key.

21. A method of authenticating communication partners according to claim 18, wherein said masking operation comprises an encryption operation.

22. A method of authenticating a communication partner, according to claim 15:

(d) wherein a first communication partner directs to a second communication partner a first authentication tag which allows said second communication partner to authenticate said first communication partner; and (e) wherein said second communication partner directs to said first communication partner a second authentication tag which allows said first communication partner to authenticate said second communication partner.

23. A method of authenticating a communication partner, according to claim 22:

(f) wherein at least one of said first and second authentication tags is communicated between said first and second partners along with at least a portion of said composite key, in order to minimize the number of communication flows between said first and second communication partners.

24. Means for authenticating a communication partner in an insecure communication channel wherein authenticity of communication partners is determined by possession of a long-lived shared secret key, comprising:

(a) means for exchanging data flows between communication partners, to define a composite key, wherein at least a portion of said data flows has been encrypted or otherwise masked in a manner which utilizes said long-lived shared secret key;

(b) means for passing at least one authentication tag between said communication partners, wherein said at least one authorization tag is defined by a transform taken over a plurality of parameters and at least partially based on said composite key, said transform including at least one of (i) a message authentication code which is keyed by said long-lived shared secret key; (ii) a cryptographic hash function taken over said long-lived shared secret key; and (iii) a masking operation involving said long-lived shared secret key; and (c) means for utilizing said authentication tag to determine authenticity of at least one communication partner.

* * * * *